United States Patent
Dai et al.

(10) Patent No.: US 11,438,046 B2
(45) Date of Patent: Sep. 6, 2022

(54) CHANNEL ESTIMATION IN MIMO SYSTEMS

(71) Applicant: BRITISH TELECOMMUNICATIONS PUBLIC LIMITED COMPANY, London (GB)

(72) Inventors: Linglong Dai, London (GB); Jingbo Tan, London (GB); Bichai Wang, London (GB); Richard MacKenzie, London (GB); Mo Hao, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 17/310,839

(22) PCT Filed: Jan. 23, 2020

(86) PCT No.: PCT/EP2020/051653
§ 371 (c)(1),
(2) Date: Aug. 26, 2021

(87) PCT Pub. No.: WO2020/173627
PCT Pub. Date: Sep. 3, 2020

(65) Prior Publication Data
US 2022/0190899 A1 Jun. 16, 2022

(30) Foreign Application Priority Data

Feb. 28, 2019 (CN) .......................... 201910149645.4

(51) Int. Cl.
*H04B 7/06* (2006.01)
*H04B 7/0417* (2017.01)
(Continued)

(52) U.S. Cl.
CPC ......... *H04B 7/0639* (2013.01); *H04B 7/0417* (2013.01); *H04B 7/0456* (2013.01);
(Continued)

(58) Field of Classification Search
CPC .. H04B 7/0639; H04B 7/0417; H04B 7/0456; H04B 7/0626; H04B 7/0404; H04L 25/0242
See application file for complete search history.

(56) References Cited

U.S. PATENT DOCUMENTS

| 8,243,860 B1 * | 8/2012 | Lee ..................... H04L 25/0228 375/346 |
| 2008/0240031 A1 * | 10/2008 | Nassiri-Toussi ....... H04B 7/065 370/329 |

(Continued)

FOREIGN PATENT DOCUMENTS

| CN | 108964726 A | 12/2018 |
| EP | 3429089 A1 | 1/2019 |

OTHER PUBLICATIONS

Choi J., et al., "Advanced Limited Feedback Designs for FD-MIMO Using Uniform Planar Arrays," 2015 IEEE, 6 pages.
(Continued)

*Primary Examiner* — Harry H Kim
(74) *Attorney, Agent, or Firm* — Patterson Thuente IP

(57) ABSTRACT

A method of performing channel estimation in a multiple-input-multiple-output (MIMO) communication system comprising a downlink device and an uplink device arranged to communicate over a communication channel, the method including at the uplink device: analyzing a first channel vector representing channel gains between the downlink device and a first antenna of the uplink device in the angular domain to identify a set of angular domain support points; generating from the set of angular domain support points a value vector; and feeding back from the uplink device to the downlink device an indication of the value vector; and at the downlink device: analyzing a second channel vector representing channel gains between the downlink device and a second antenna of the uplink device; generating a transmit steering matrix; and generating an estimate of the first channel vector.

17 Claims, 5 Drawing Sheets

(51) Int. Cl.
*H04B 7/0456* (2017.01)
*H04L 25/02* (2006.01)
*H04B 7/0404* (2017.01)

(52) U.S. Cl.
CPC ....... *H04B 7/0626* (2013.01); *H04L 25/0242* (2013.01); *H04B 7/0404* (2013.01)

(56) References Cited

U.S. PATENT DOCUMENTS

| | | | | |
|---|---|---|---|---|
| 2013/0028341 A1* | 1/2013 | Ayach | .................. | H04B 7/0617 |
| | | | | 375/267 |
| 2018/0323846 A1* | 11/2018 | Tsai | ..................... | H04B 7/0617 |
| 2019/0123948 A1* | 4/2019 | Zhao | ................... | H04B 7/0452 |

OTHER PUBLICATIONS

International Search Report and Written Opinion for Application No. PCT/EP2020/051653, dated Apr. 1, 2020, 11 pages.
Jindal N., "MIMO Broadcast Channels with Finite Rate Feedback," pp. 1-18.
Mumtaz S., et al., "MmWave Massive MIMO: A Paradigm for 5G," Academic Press, Elsevier, 2016, 1 page(p. 116).

\* cited by examiner

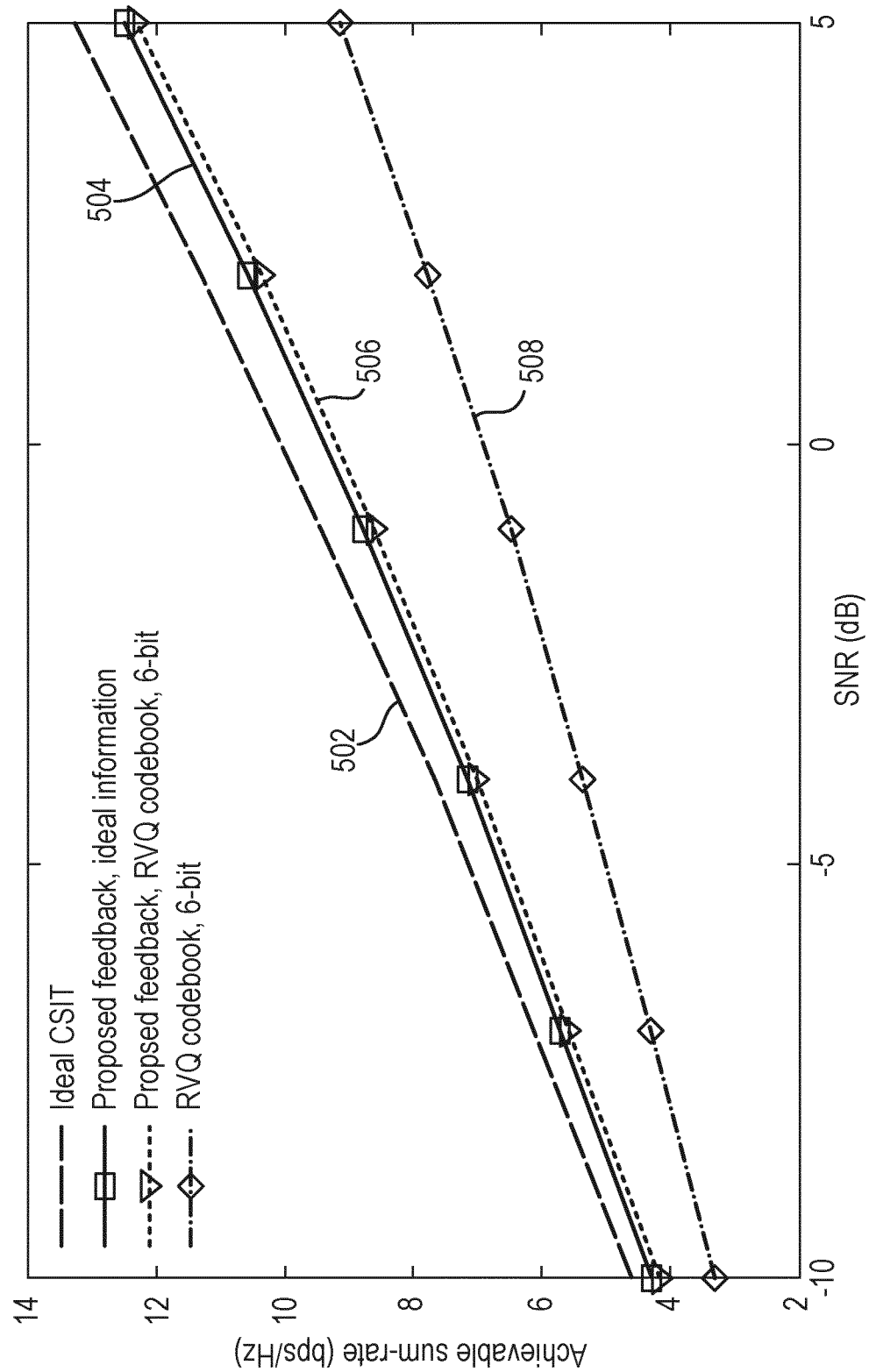

CHANNEL ESTIMATION IN MIMO SYSTEMS

PRIORITY CLAIM

The present application is a National Phase entry of PCT Application No. PCT/EP2020/051653, filed Jan. 23, 2020, which claims priority from CN Patent Application No. 201910149645.4, filed Feb. 28, 2019, each of which is hereby fully incorporated herein by reference.

FIELD

The present disclosure relates generally to performing channel estimation in MIMO communication systems.

BACKGROUND

There has been increasing interest in millimeter-wave (mmWave) wireless communications systems due to their promise for meeting increasing bandwidth requirements of wireless devices. MmWave systems typically operate in the frequency band of 30-300 GHz. This is a much larger frequency band than the sub-6 GHz band currently used for Long Term Evolution (LTE) network and consequently larger bandwidths can be supported compared to those that can currently be supported with existing systems operating in the sub-6 GHz band. One problem associated with mmWave communications is the relatively high free-space path loss that can be experienced. This high path loss can cause heavy attenuation in signals that experience blockages or that are communicated over long distances.

An approach to overcome this problem is to implement mmWave communications within a multiple-input-multiple-output (MIMO) system. The relatively short wavelengths of mmWave communications enables the antenna spacing of the MIMO system to be reduced and consequently enables a relatively large antenna array (containing e.g. 256 to 1024 antenna elements) to be packed in a relatively small physical size compared to what is achievable when operating in the sub-6 GHz band. These large antenna arrays are able to effectively compensate for the high path loss induced by the higher frequency communications of mmWave.

MIMO systems may be implemented with full digital precoding. An example MIMO base station (BS) with full digital precoding is shown in FIG. 1.

The base station 100 comprises a digital precoder 102 and a plurality of radio frequency (RF) chains (denoted generally at 104) coupled to the digital precoder 102. Each RF chain is coupled to an antenna (denoted generally at 108). In the example shown here, each RF chain is coupled to a respective antenna by an amplifier. The amplifiers are denoted generally at 106.

The digital precoder 102 receives a plurality of data streams, denoted generally at 110, and operates to control the amplitude and phase of each received data stream to achieve a transmitted beam from the antennas 108 with a desired direction and gain. The data streams, once precoded, are passed through the RF chains 104. Each RF chain may support a single data stream. The RF chains operate to convert the digitally pre-coded data streams into analogue signals for transmission by the antennas 108. Each RF chain typically includes transceiver circuitry for generating the analogue signals from the received digitally pre-coded data streams. The transceiver circuitry might include, for example, digital-to-analogue (DAC) converters, mixers and frequency converters. The output signals generated by each RF chain are then amplified by a respective amplifier and transmitted from a respective antenna.

Alternatively, MIMO systems may be implemented using hybrid precoding, which divides the precoding operations between analogue and digital domains. The digital precoding can be implemented using a digital precoder to control the weights associated with each RF chain. Analogue precoding can be implemented by controlling the phase of the signals transmitted by the antennas using phase shifters.

It has been appreciated that accurate channel state information (CSI) estimation for the communication channel between the base station and a user device of the MIMO system is important to the performance of the MIMO system. For example, the downlink transmission rate (i.e. the transmission rate from the BS to the user device) might depend on the precoding to reduce interference between different data streams. Accurate knowledge of the CSI can therefore be used to set the parameters of the precoding to reduce the interference and hence improve performance.

It has been found that the difficulty in obtaining accurate downlink channel estimations can increase with increasing numbers of antennas at the BS. In systems where channel reciprocity between the uplink channel and downlink channel holds, these problems can be avoided by obtaining the CSI for precoding from uplink channel estimates. However, there are certain wireless systems in which full channel reciprocity does not hold. For example, some user devices are configured to employ less antennas for transmitting in the uplink direction than they employ for receiving in the downlink direction. This may be done to reduce the power and hardware requirements of the device on the basis that transmitting RF chains are more power and hardware-intensive than receiving RF chains. In these cases, only partial channel reciprocity holds, making some form of channel feedback from the user device to the BS desirable to obtain a full CSI estimate.

SUMMARY

According to the present disclosure there is provided a method of performing channel estimation in a multiple-input-multiple-output (MIMO) communication system comprising a downlink device and an uplink device arranged to communicate over a communication channel, the method comprising: at the uplink device: analyzing a first channel vector representing channel gains between the downlink device and a first antenna of the uplink device in an angular domain to identify a set of angular domain support points each indicating a respective element of the first channel vector in the angular domain; generating from the set of angular domain support points a value vector containing elements of the first channel vector in the angular domain representing the largest channel gains; feeding back from the uplink device to the downlink device an indication of the value vector; and at the downlink device: analyzing a second channel vector representing channel gains between the downlink device and a second antenna of the uplink device in the angular domain to identify the set of angular domain support points; generating from the set of angular domain support points a transmit steering matrix; and generating an estimate of the first channel vector from the indication of the value vector fed back from the uplink device and the generated transmit steering matrix.

The method may further comprise using the estimate of the first channel vector to generate an estimate of a channel matrix modeling the channel between the downlink device and uplink device.

The method may further comprise deriving a digital precoding matrix using the estimated channel matrix for use in precoding data to be transmitted from the downlink device.

The uplink device may be arranged to use the first antenna only for receiving communications from the downlink device and to use the second antenna for receiving communications from the downlink device and transmitting communications to the downlink device.

In embodiments analyzing the first channel vector in the angular domain may comprise transforming the first channel vector to the angular domain using a discrete Fourier transform (DFT) matrix.

The set of angular domain support points may be identified from the non-zero elements of the channel matrix in the angular domain.

The value vector may be generated by selecting the P largest elements of the first channel vector in the angular domain, where P is the number of resolvable paths between the downlink device and the uplink device.

The method may comprise quantizing the value vector at the uplink device using a codebook, the indication of the value vector comprising a selected index to the codebook.

The indication of the value vector may further comprise a magnitude of the value vector.

Only the selected index and the magnitude of the value vector might be fed back from the uplink device to the downlink device.

The selected index, $I_n$, may be selected according to $$I_n = \underset{i=1,2\ldots 2^B}{\operatorname{argmin}} \left| \frac{\tilde{g}_2^H}{\|\tilde{g}_2\|} c_i \right|,$$

where $\tilde{g}_2^H$ is the Hermitian conjugate of the value vector $\tilde{g}_2$, $C=\{c_1, c_2, \ldots c_{2^B}\}$ is the codebook, $c_i$ is a quantized vector of the codebook C and B is the number of bits to access the codebook.

Each angular domain support point of the identified set of angular domain support points may be dependent on a beam angle of departure for a respective path between the downlink device and uplink device.

The transmit steering matrix may be generated using the one or more beam angles of departure calculated from the set of angular domain support points.

The set of angular domain support points φ may be given by:

$$\phi = \left\{ \frac{d}{\lambda} N \sin\phi_1, \ldots \frac{d}{\lambda} N \sin\phi_P \right\},$$

where d is the spacing between adjacent antenna elements of the downlink device; A is the wavelength of the signal emitted from the downlink device; N is the number of antenna elements at the downlink device and $\phi_p$ is angle of departure of a beam of signals emitted by the downlink device along the p'th path between the downlink device and uplink device.

In embodiments, analyzing the second channel vector in the angular domain may comprise transforming the second channel vector to the angular domain using the discrete Fourier transform (DFT) matrix.

The MIMO communication system may be a time-division-duplex (TDD) MIMO communication system.

According to a second aspect of the present disclosure there is provided a multiple-input multiple-output (MIMO) communication system comprising a downlink device and an uplink device configured to communicate over a communication channel; the uplink device comprising: a plurality of antennas; and a processing unit configured to: analyze a first channel vector representing channel gains between the downlink device and a first antenna of the uplink device in an angular domain to identify a set of angular domain support points each indicating a respective element of the first channel vector in the angular domain; generate from the set of angular domain support points a value vector containing the elements of the first channel vector in the angular domain representing the largest channel gains; and feed back to the downlink device an indication of the value vector; and the downlink device comprising: a plurality of antennas; and a processing unit configured to: analyze a second channel vector representing channel gains between the downlink device and a second antenna of the uplink device in the angular domain to identify the set of angular domain support points; generate from the set of angular domain support points a transmit steering matrix; and generate an estimate of the first channel vector from the indication of the value vector fed back from the uplink device and the generated transmit steering matrix.

BRIEF DESCRIPTION OF DRAWINGS

The present disclosure will now be described by way of example with reference to the accompanying drawings. In the drawings:

FIG. 5 shows simulation results comparing data rates achieved with the channel estimation technique described herein with conventional channel estimation techniques.

DETAILED DESCRIPTION

Figure 1:
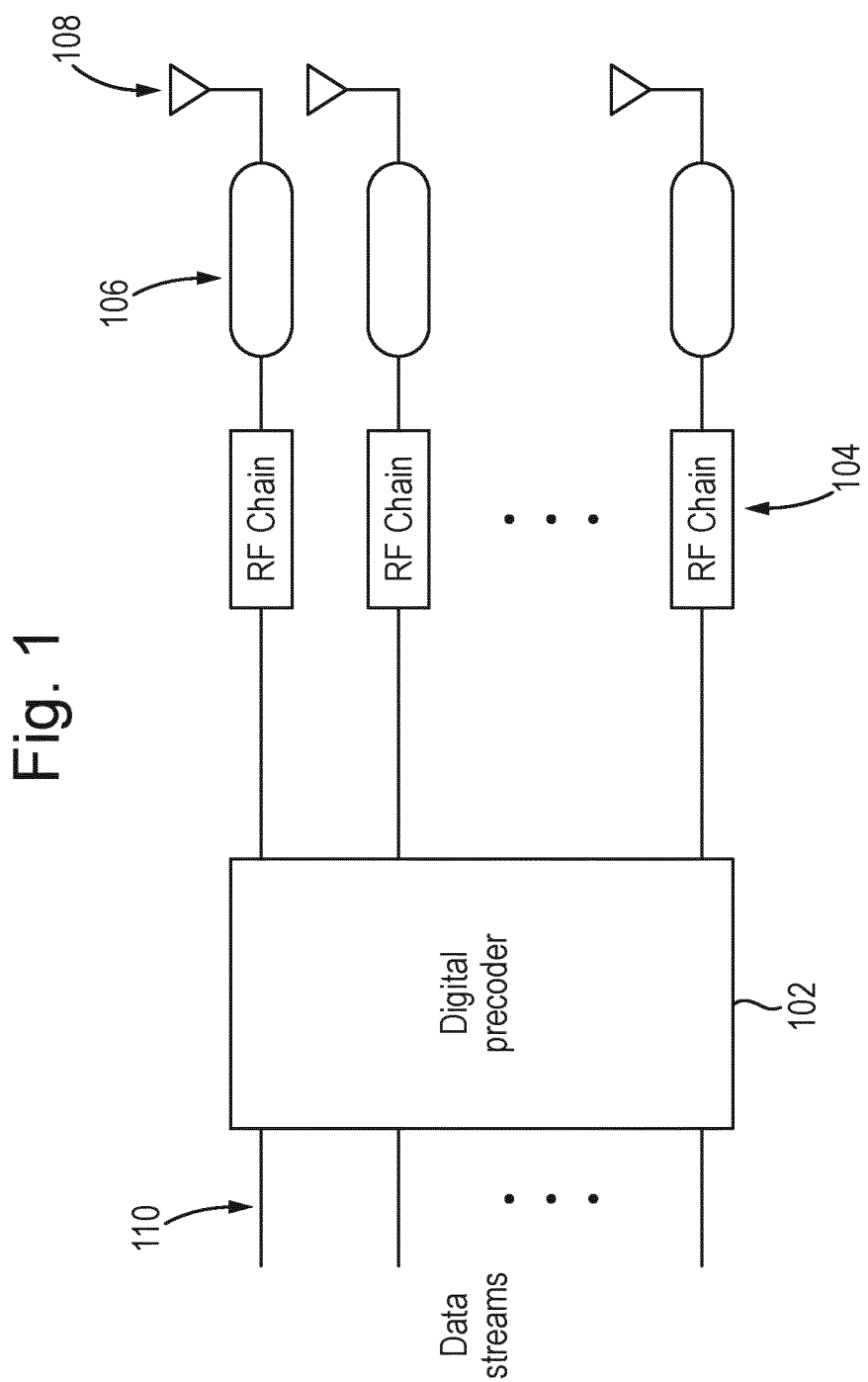
FIG. 1 shows example of a fully digitally pre-coded MIMO transmitter.

One approach to address the problem of obtaining a full CSI estimate in the case of only partial channel reciprocity is to feed back to the BS the channel estimates (i.e. the channel vectors) for the channels between the BS and the receive-only antennas of the user device. This may be done by performing limited feedback through the use of a quantization codebook of vectors known to the BS and the user device. At the user device, a channel vector is quantized using the codebook and an index to the selected vector of the codebook that quantizes the channel vector is fed back to the BS. The feedback overhead of this approach is B bits, where B is the number of bits needed to index the codebook (i.e., the codebook contains up to $2^B$ quantized vectors). In this approach, it is typically the case that full-dimensional channel vectors are quantized (e.g., for a BS containing N antennas, N-element channel vectors are quantized and fed back to the BS).

The present disclosure is directed to an approach to performing channel estimation in a MIMO system in which channel vectors are analyzed in the angular domain. A channel vector represented in the angular domain may be referred to herein as an angular-domain channel vector. The MIMO system includes a downlink device (e.g. a BS) and an uplink device (e.g. a user device). At the uplink device, a set of one or more elements of a channel vector represented in the angular domain (i.e. an angular-domain channel vector) are identified. This channel vector is not known by the downlink device. The value of each identified element may represent the channel gain for a respective physical path between the downlink device and the uplink device of the MIMO system. In some examples, the set of identified elements of the angular-domain channel vector are the set of non-zero elements of that vector. The set of identified elements are referred to herein as angular domain support points because these points identify the non-zero components of the channel vector in the angular domain. From the set of angular domain support points, a vector formed of the elements of the angular domain vector representing the largest channel gains is identified. This vector may be referred to herein as a value vector. The value vector is typically of a size less than N, where N is the number of antennas at the downlink device, and in some examples may be of size L, where L is the number of resolvable physical paths between the downlink and uplink devices. For massive MIMO systems, it is typically the case that L is significantly less than N. An indication of the identified value vector is then fed back from the uplink device to the downlink device, for example using a quantization codebook. At the downlink device, a further channel vector known to the downlink device is analyzed in the angular domain to identify the same set of angular domain support points. These angular domain support points are used with the fed-back quantized vector to generate an estimate of the unknown channel vector at the downlink device. This approach enables channel estimates to be formed at the downlink device without the need to feedback a quantized N-dimensional channel vector. It also avoids the need to feedback the angular-domain support points, which have been identified as common to both the uplink and downlink devices. This can reduce the channel feedback overhead.

Aspects of the present disclosure will now be described in more detail below.

Figure 2:
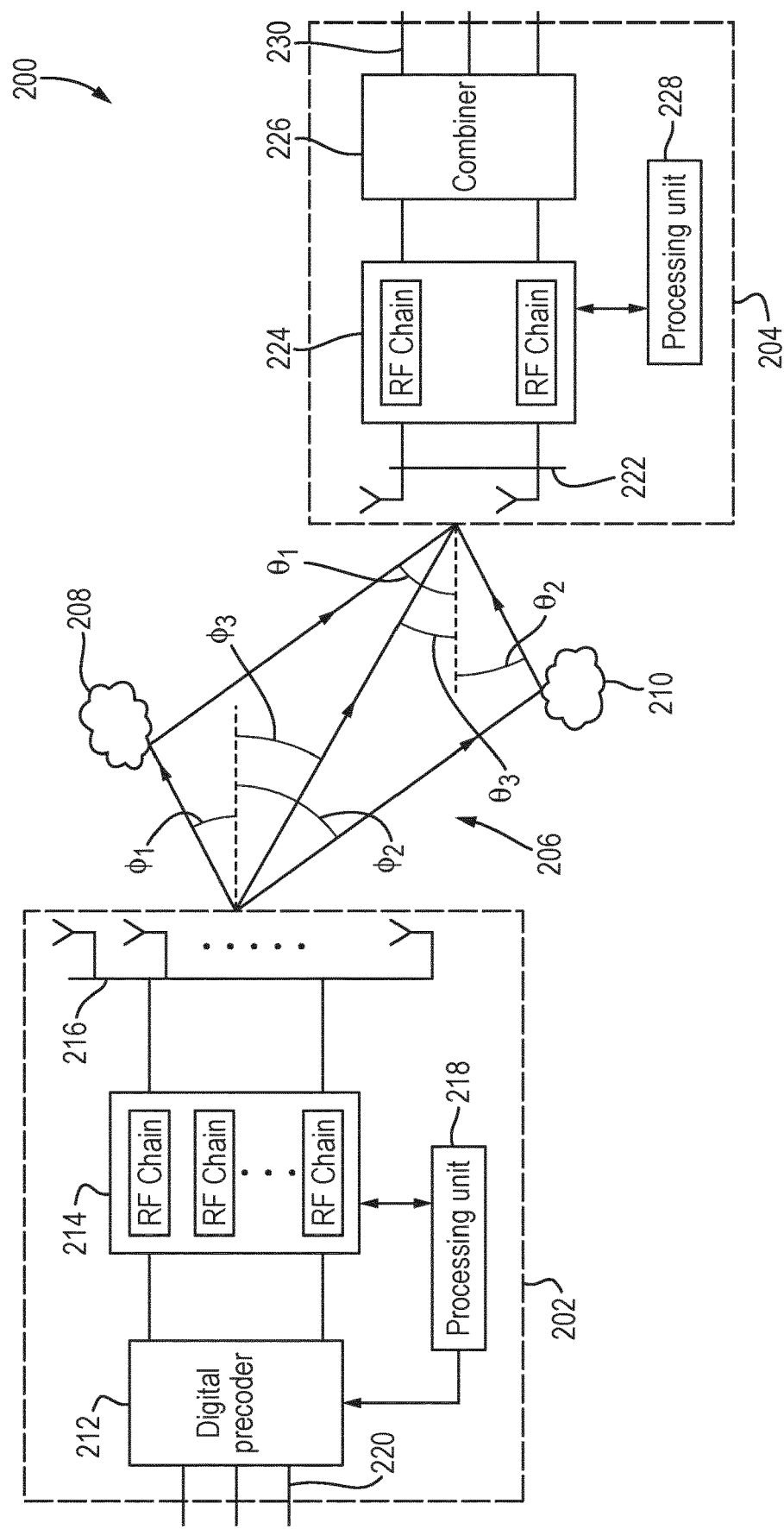
FIG. 2 shows an example of a MIMO communication system.

FIG. 2 shows a MIMO communication system 200. The MIMO system 200 comprises a downlink device 202 and a uplink device 204. The downlink device 202 may for example be a base station (BS), or more generally a MIMO transmitter. The uplink device 204 may be a user device, or a MIMO receiver. The downlink device 202 operates to transmit wireless communication signals in the downlink direction to the uplink device 204 over communication channel 206. The number of physical communication paths defined by the channel is denoted P. In this example, P=3 for illustration. P denotes the number of significant, or resolvable physical paths. A resolvable or significant path may be a path for which the signal power exceeds some threshold. Scattering objects 208 and 210 operate to scatter the signals received from the downlink device 202 that in part define the resolvable paths.

The MIMO system 200 is a time division duplex (TDD) system (a TDD MIMO system).

The downlink device 202 comprises a digital precoder 212, a first set of RF chains denoted generally at 214, an antenna array 216 and a processing unit 218. The antenna array 216 comprises N antennas. The antenna array 216 in this example is a uniform linear array (ULA).

The digital precoder 212 receives a plurality $N_s$ of data streams 220 and performs digital precoding on those streams. The precoded streams are then passed through the first set of RF chains 214. Each RF chain may support a single data stream. The number of RF chains may be equal to the number of antennas, N. The RF chains are connected to the antenna array 216.

The uplink device 204 comprises a lens array 222, which in this example is also a ULA. The lens array 222 comprises M antennas. In the example shown in FIG. 2, M=2. The lens array 222 is coupled to a second set of RF chains 224. The second set of RF chains 224 are coupled to a digital combiner 226. The uplink device 204 further comprises a processing unit 228.

In operation, precoder 212 receives a plurality $N_s$ of data streams. The precoder performs digital precoding on those data streams. The precoding may include adjusting the weight and/or phase of each data stream. The precoding may be performed to reduce interference between different data streams. The precoding may be performed by applying a digital precoding matrix, F, to the data streams. The precoded data streams are passed over the first set of RF chains 214 to generate analogue signals. A single data stream is passed through each RF chain; i.e. each RF chain supports a single data stream. The analogue signal generated by an RF chain is indicative, or representative of, the data stream that passed through that RF chain. The signals generated by the RF chains in the first set of RF chains 214 are passed to the antenna array 216 for transmission over the communication channel 206 to the uplink device 204. The signals are sent to the antennas of the antenna array 216 so that the signals transmitted by the array 216 form a discrete number of beams. A beam refers to a collection of one or more signals focused in a particular direction or angle of travel. The signals are transmitted from the antenna array 216 so that a beam travels along each communication path; i.e. each beam travels along a respective physical path. In this illustrated example, the emitted signals form three beams: a first beam that travels over the first path, a second beam that travels over the second path and a third beam that travels over the third path.

Each beam has an angle of departure (AoD) from the antenna array 216. The angle of departure may be measured relative to a reference direction defined with respect to the array. The angle of departure for the beam over the first path is denoted $\phi_1$, the angle of departure for the beam over the second path is denoted $\phi_2$ and the angle of departure for the beam over the third path is denoted $\phi_3$.

The emitted beams are communicated over the channel and received at the device 204. Each beam is incident on the antenna array 222 at an angle of arrival (AoA). The angle of arrival for each beam is measured relative to a reference direction defined with respect to the array 222. The angle of arrival for the beam over the first path is denoted $\theta_1$, the angle of arrival for the beam over the second path is denoted $\theta_2$ and the angle of arrival for the beam over the third path is denoted $\theta_3$.

The beams are received at the antenna array 222. The antennas of the array 222 are coupled to RF chains of the second set of RF chains 224. Each antenna of the array 222 might be coupled to a respective RF chain. The second set of RF chains 224 perform inverse operations to the RF chains 214 of the device 202. That is, whereas the first set of RF chains 214 perform processing operations on received precoded data streams to generate analogue signals, the second set of RF chains 224 operate to generate a digital signal representation of a precoded data stream from a received analogue signal. The digital signals generated by each RF chain in the second set of RF chains 224 are then communicated to the combiner 226. Combiner 226 operates to undue, or remove, the precoding applied to the data streams by the precoder 212 of the downlink device 202 to generate decoded data streams 230.

The received signal at the uplink device 204 can be modeled as:

$$y = HFs + n \quad (1)$$

In equation (1), y is the signal vector received at the uplink device 204; H is the spatial channel matrix modeling the channel between the downlink device 202 and the uplink device 204; F is the digital precoder matrix applied by the digital precoder 212, s is the transmitted signal vector from the downlink device 202 and n is the noise vector.

The vector y is of size M×1, i.e. it is an M-element vector. The vectors is of size N×1, i.e. it is an N-element vector. The channel matrix H is an M×N matrix, i.e. a matrix with M rows and N columns. The channel matrix H is defined as:

$$H = [h_1, h_2, \ldots, h_M]^T \quad (2)$$

where $h_i$ represents the channel vector between the antennas of the device 202 and the i'th antenna of the device 204. Each channel vector $h_i$ is therefore an N×1 vector (i.e. an N-element vector), with the j'th element of the channel vector, $[h_i]_j$, representing the channel between the j'th antenna of the downlink device 202 and the i'th antenna of the uplink device 204.

The digital precoder matrix F is an N×N matrix. The noise vector n is an additive white Gaussian noise (AWGN) vector satisfying:

$$n \sim CN(0, \sigma^2 I_M) \quad (3)$$

where $\sigma^2$ represents the variance of the noise power, and $I_M$ is an M×M identity matrix.

The precoder matrix F satisfies the following power constraint:

$$\|F\|_F^2 = \rho \quad (4)$$

where $\rho$ is the average received signal power at the receiver.

The transmitted signal vector s satisfies:

$$E(ss^H) = I_M \quad (5)$$

The antenna array 216 is a uniform linear array (ULA) and so the channel matrix modeling the channel can be represented as:

$$H = \sqrt{\frac{MN}{P}} \sum_{p=1}^{P} g_p a(\theta_p, M) a(\phi_p, N)^H \quad (6)$$

where $g_p$ is the path gain for the p'th physical path, $a(\phi, N)$ and $a(\theta, M)$ are the array response vectors at the downlink device 202 and uplink device 204 respectively, $\phi_p$ is the angle of departure for the p'th path and $\theta_p$ is the angle of arrival for the p'th path. The values of $g_p$ satisfy CN (0,1) and $\theta_p$, $$\phi_p \in \left(-\frac{\pi}{2}, \frac{\pi}{2}\right).$$

The array response vector $a(\phi, N)$ can be written as:

$$a(\phi, N) = \frac{1}{\sqrt{N}} \left[1, e^{\frac{2\pi jd}{\lambda} \sin\phi}, \ldots, e^{\frac{2\pi jd(N-1)}{\lambda} \sin\phi}\right]^T \quad (7)$$

where $\lambda$ is the wavelength of the signal and d is the spacing between adjacent antennas at the downlink device 202. The values of $\lambda$ and d are expressed in the same units, e.g. meters.

A matrix A can be defined as:

$$A = [a(\phi_1, N), a(\phi_2, N) \ldots a(\phi_P, N)] \quad (8)$$

And a vector $g_m$ can be defined as:

$$g_m = [g_1 a(\theta_1, M)(m), g_2 a(\phi_2, M)(m), \ldots, g_L a(\phi_P, M)(m)]^T \quad (9)$$

With these definitions, we have (using equations (2) and (6)):

$$h_m = A g_m \quad (10)$$

The matrix A is the transmit steering matrix; i.e. the steering matrix of the antenna array 216 of the downlink device 202.

Equation (10) outlines that a channel vector, $h_m$, can be determined from steering matrix A, which is dependent on the angle of departures $\phi$, and $g_m$ which may be viewed as a receiver gain vector.

In the example shown in FIG. 2, the uplink device 204 contains two antenna elements, and thus H=[$h_1,h_2$]. It follows from equation 10 that:

$$h_1 = A g_1 \quad (11)$$

$$h_2 = A g_2 \quad (12)$$

Uplink device 204 is configured so that a first of its antennas (referred to as antenna 1) is arranged to receive downlink transmissions from the downlink device 202 and communicate uplink transmissions to the downlink device 202, and the second of its antennas (referred to as antenna 2) is arranged only to receive downlink transmissions from the downlink device 202. That is, the uplink device 204 cannot communicate uplink transmissions from antenna 2, i.e. it cannot transmit signals in the uplink direction from antenna 2. Consequently, there is only partial reciprocity of communication channel 206, which means that the downlink device 202 is capable of determining an estimate of the channel vector $h_1$ denoting the channel vector between the antennas of downlink device 202 and antenna 1 of uplink device 204, e.g. through uplink channel estimation techniques, but is not capable of accurately estimating $h_2$ (denoting the channel vector between the antennas of downlink device 202 and antenna 2 of uplink device 204) using similar techniques.

Figure 3:
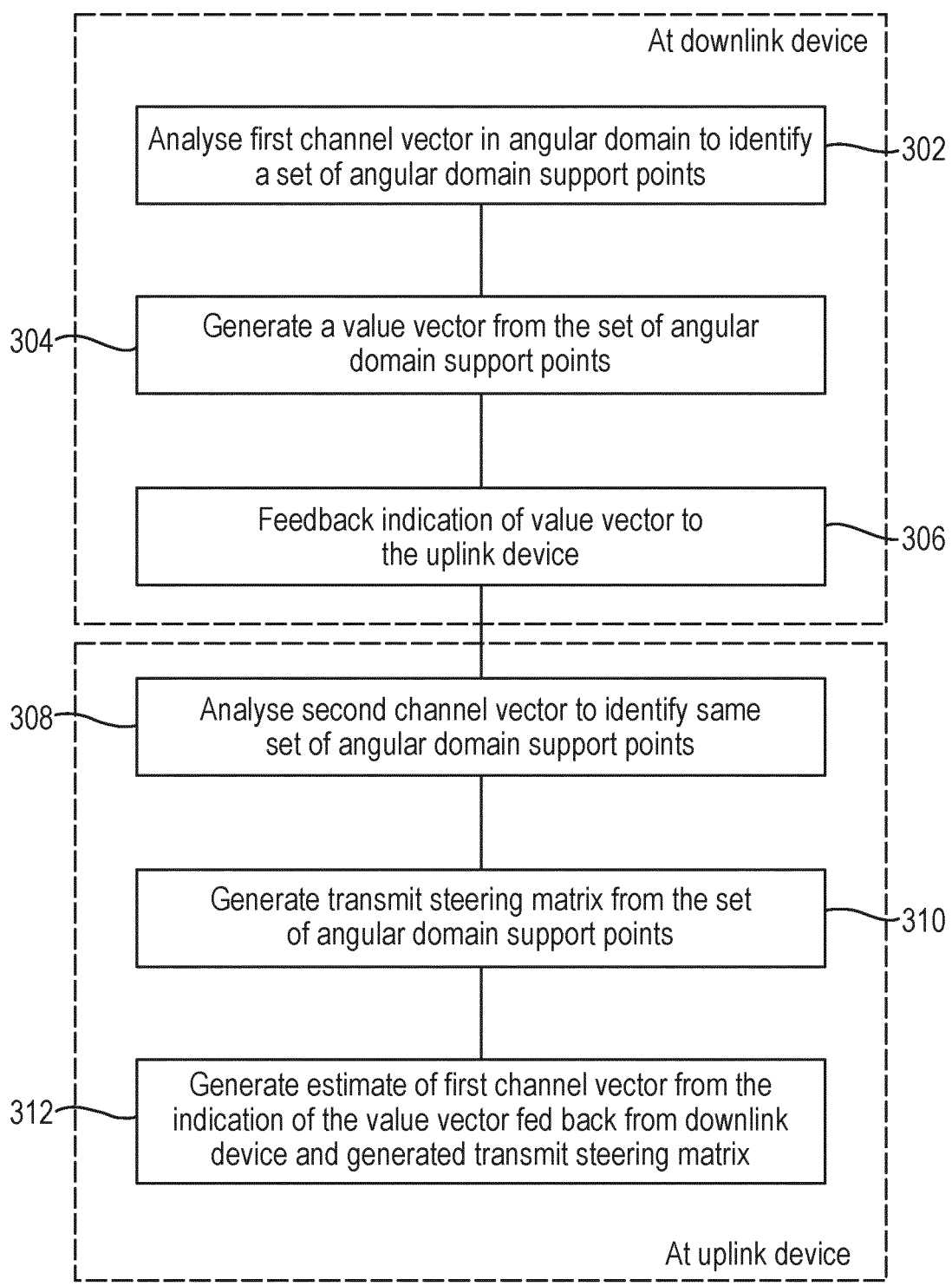
FIG. 3 shows a flowchart of activities for performing channel estimation according to the present disclosure.

An approach for estimating the channel vector $h_2$ at the downlink device 202 will now be described with reference to the flow chart in FIG. 3. In the following description, it is assumed that the downlink device 202 is capable of calculating an estimate of the channel vector $h_1$ (for example through uplink channel estimation). It is also assumed that the uplink device 204 is capable of calculating an estimate of both channel vectors $h_1$ and $h_2$, for example through downlink channel estimation.

At 302 the uplink device 204 analyzes the channel vector $h_2$ in the angular domain to identify a set of angular domain support points for the vector $h_2$. In embodiments, 302 may be performed by the processing unit 228 of the uplink device 204. The uplink device 204 analyzes the channel vector $h_2$ in the angular domain by analyzing an angular-domain representation of the channel vector $h_2$, denoted $\tilde{h}_2$. In other words, $\tilde{h}_2$ is the angular domain vector of $h_2$, or put another way, $\tilde{h}_2$ is the channel vector $h_2$ in the angular domain. Each angular domain support point indicates, or identifies, a respective element of the angular domain vector $\tilde{h}_2$.

The angular domain vector $\tilde{h}_2$ can be generated by performing a discrete Fourier transform (DFT) on the channel vector $h_2$. This may be implemented using a DFT matrix. The channel vector $h_2$ can be multiplied by the DFT matrix D to generate the angular domain vector $\tilde{h}_2$. Mathematically, the uplink device 204 generates the angular domain vector according to:

$$\tilde{h}_2 = D h_2 \tag{13}$$

The DFT matrix D can be expressed as:

$$D = \frac{1}{\sqrt{N}} \begin{pmatrix} 1 & \cdots & e^{-\frac{2\pi j(N-1)}{N}} \\ \vdots & \ddots & \vdots \\ e^{-\frac{2\pi j(N-1)}{N}} & \cdots & e^{-\frac{2\pi j(N-1)(N-1)}{N}} \end{pmatrix} \tag{14}$$

Thus, the elements of D are given by:

$$[D]_{p'q'} = \frac{1}{\sqrt{N}} e^{-\frac{2\pi j p' q'}{N}} \tag{15}$$

where p',q'=0, 1, . . . , N−1.

To understand how an analysis of the angular domain vector can be used to identify the angular domain support points, consider an example where the uplink device 204 contains only a single antenna (i.e. M=1) and there is only one physical path (i.e. P=1). In this case, $a(\theta,M)=1$ and equation (10) reduces to:

$$H = h = g_1 a(\phi_1, N) \tag{16}$$

We also have:

$$\tilde{h} = D h \tag{17}$$

It follows from equation (15) that the p'th row of D is given by:

$$[D]_p = \frac{1}{\sqrt{N}} \left[ 1, e^{-\frac{2\pi j p}{N}}, \ldots, e^{-\frac{2\pi j(N-1)}{N}} \right] \tag{18}$$

Using equations (7), (16), (17) and (18), the p'th element of h can be written as:

$$[\tilde{h}]_p = \frac{1}{\sqrt{N}} \left[ 1, e^{-\frac{2\pi j p}{N}}, \ldots, e^{-\frac{2\pi j(N-1)}{N}} \right] \cdot g_1 a(\phi_1, N)$$

$$= \frac{1}{\sqrt{N}} \left[ 1, e^{-\frac{2\pi j p}{N}}, \ldots, e^{-\frac{2\pi j(N-1)}{N}} \right] \cdot g_1 \cdot$$

$$\frac{1}{\sqrt{N}} \left[ 1, e^{\frac{2\pi j d}{\lambda}\sin\phi_1}, \ldots, e^{\frac{2\pi j d(N-1)}{\lambda}\sin\phi_1} \right]^T \tag{19}$$

$$= \frac{g_1}{N} \sum_{k=0}^{N-1} e^{-j\left(\frac{2\pi}{N}kp - \frac{2\pi d}{\lambda}k\sin\phi_1\right)}$$

$$= \frac{g_1}{N} \sum_{k=0}^{N-1} e^{-j 2\pi k\left(\frac{p}{N} - \frac{d}{\lambda}\sin\phi_1\right)}$$

$$= \frac{g_1}{N} e^{-j 2\pi \eta_p \frac{N-1}{2}} \frac{\sin(\pi N \eta_p)}{\sin(\pi \eta_p)}$$

where $$\eta_p = \frac{p}{N} - \frac{d}{\lambda}\sin\phi_1.$$

Taking the modulus of equation (19) gives:

$$\left| [\tilde{h}]_p \right| = \frac{|g_1|}{N} \left| \frac{\sin(\pi N \eta_p)}{\sin(\pi \eta_p)} \right| = \frac{|g_1|}{N} f(\eta_p) \tag{20}$$

where $$f(\eta_p) = \left| \frac{\sin(\pi N \eta_p)}{\sin(\pi \eta_p)} \right|.$$

Equation (20) demonstrates that $|[\tilde{h}]_p|$ is a sample of the function $f(\eta_p)$ at sample points $\eta_p$. In other words, the values of the elements of the angular domain vector h are given by the function $f(\eta_p)$ at sample points $\eta_p$. The function $f(\eta_p)$ has a sinc-like distribution with a central point $f(0)$.

It follows from equation (20) that when $\eta_p = 0$:

$$\sin\phi_1 = \frac{\lambda p_0}{dN} \tag{21}$$

where $p_0$ is the element of the angular domain vector $\tilde{h}$ corresponding to the central point of the function $f(\eta_p)$. The value of $p_0$ is therefore given as:

$$p_0 = \left\lfloor \frac{d}{\lambda} N \sin\phi_1 \right\rceil \tag{22}$$

where $\lfloor$ and $\rceil$ denote that $p_0$ is given to the nearest integer (since $p_0$ identifies an element of the angular domain vector).

When $\phi_1$ satisfies equation (21), the angular domain vector $\tilde{h}$ has only one non-zero element, $p_0$. If $\phi_1$ does not satisfy equation (21) then $\tilde{h}$ might have multiple non-zero elements. However, because in a typical system the value of N (the number of antennas at the downlink device 202) is relatively large, $\tilde{h}$ will still be distributed about the point $p_0$ and only vector elements in the vicinity of the point $p_0$ will take non-negligible values. In other words, even if does not satisfy equation (21), non-negligible values of the angular domain vector $\tilde{h}$ will still be concentrated around the vector element $p_0$.

Figure 4A:
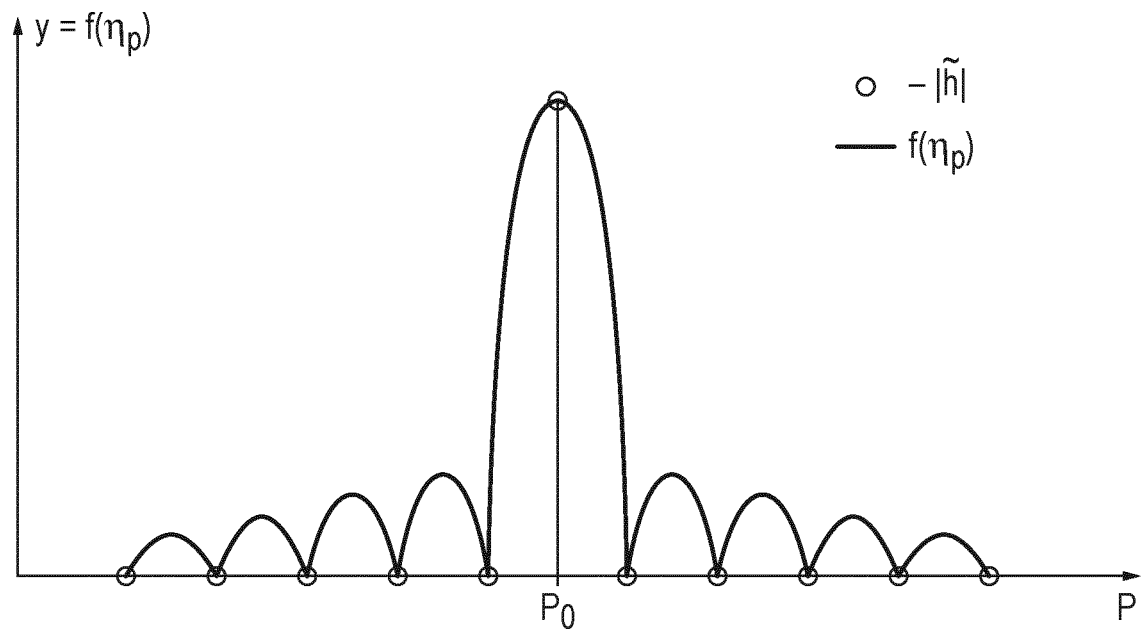
FIGS. 4A and 4B show examples of functions defined by channel vectors in the angular domain.
Figure 4B:
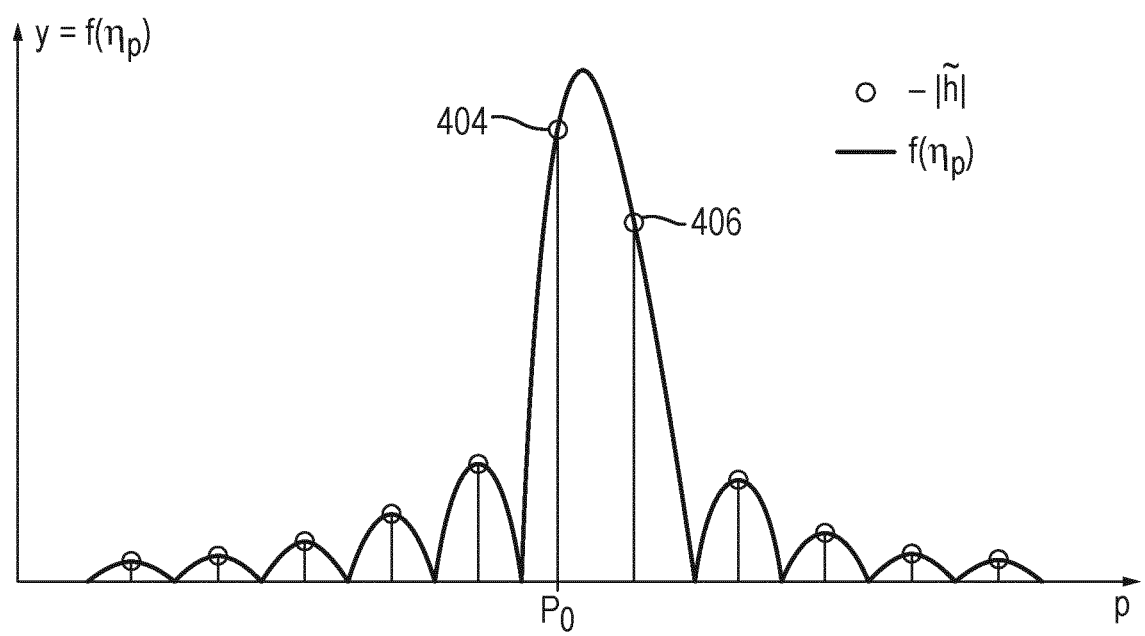

FIGS. 4A and 4B illustrate an example $f(\eta_p)$ and $|[\tilde{h}]_p|$. FIG. 4A demonstrates the case when $\phi_1$ satisfies equation (21), and FIG. 4B demonstrates the case $\phi_1$ does not satisfy equation (21). It can be seen in FIG. 4A that the only non-zero element of the angular domain vector is $p_0$. FIG. 4B shows that the angular domain vector contains multiple non-zero elements, but only those within the vicinity of $p_0$ (shown at 404 and 406) have a non-negligible value. In both figures, the circular markings denote the values of elements of the angular domain vector $\tilde{h}$. The solid line denotes the function $f(\eta_p)$ defined by the channel vector in the angular domain.

The above explanation illustrates that one physical path forms a single central point for the channel vector in the angular domain corresponding to an element $p_0$ of the angular domain vector. Put another way, the channel vector defines a function in the angular domain with a single central point, with that central point corresponding to an element $p_0$ of the angular domain vector. The central point may align exactly with the element $p_0$ (if $\phi_1$ satisfies equation (21)), or the element $p_0$ may be the element lying closest to the central point of the function (if $\phi_1$ does not satisfy equation (21), e.g. as shown in FIG. 4B). The central point (and hence the element $p_0$) is dependent on the angle of departure of the beam for the physical path, $\phi_1$.

When there are multiple physical paths between the downlink device 202 and the uplink device 204, the angular domain vector $\tilde{h}$ defines a linear combination of functions each having a single central point corresponding to a respective element of the vector $\tilde{h}$. In other words, for P physical paths, the angular domain vector $\tilde{h}$ defines a linear combination of P functions, where each of the P functions has a single central point corresponding to an element $p_0^p$ of the angular domain vector. Each element $p_0^p$ is dependent on the beam angle of departure for a respective physical path, i.e. element $p_0^p$ is dependent on the beam angle of departure for a physical path p, where p=1, . . . , P. This set of elements is referred to herein as the set of angular domain support points.

Referring back to the example system shown in FIG. 2, the uplink device 204 analyzes the angular domain vector $\tilde{h}_2$ to calculate the set of angular domain support points for the vector, $\Phi_2$ given by:

$$\Phi_2 = \{p_0^1, \ldots, p_0^P\} = \left\{\left\lfloor \frac{d}{\lambda} N \sin\phi_1 \right\rfloor, \ldots, \left\lfloor \frac{d}{\lambda} N \sin\phi_P \right\rfloor\right\} \quad (23)$$

Thus, each angular domain support point identifies a respective element of the angular domain vector. The value of the angular domain vector $\tilde{h}_2$ at each of the angular domain support points is representative of the gain for a respective physical path.

At 304, the uplink device 204 generates a value vector from the set of angular domain support points. In embodiments, 304 may also be performed by the processing unit 228.

The value vector is formed from the elements of the angular domain vector $\tilde{h}_2$ representing the largest channel gains. The value vector may be generated by selecting the L largest elements of the angular domain vector. In some examples, L=P. In other examples, L is less than P.

Mathematically, the value vector can be calculated by first applying selected rows of the DFT matrix D to the channel vector $h_2$. The rows of the DFT matrix to be applied are determined by the angular domain control points. In particular, the rows having row numbers equal to the angular domain support points are to be applied to the channel vector. This is expressed mathematically as:

$$\tilde{g}_2 = D(\Phi_2,:)h_2 \quad (24)$$

Or, put another way:

$$[\tilde{g}_2]_i = D(p_0^i,:)h_2 \quad (25)$$

where $\tilde{g}_2$ is a vector formed of P elements of the angular domain vector $\tilde{h}_2$ identified by the P angular domain support points $\Phi_2$. The vector $\tilde{g}_2$ may be referred to as an intermediate value vector.

The vector $\tilde{g}_2$ is then sorted by its norm in descending order with the L elements representing the largest channel gains then being selected. This may be done by selecting the L largest elements of the vector $\tilde{g}_2$.

Mathematically:

$$\bar{g}_2 = \mathrm{sort}(\tilde{g}_2) \quad (26)$$

$$\check{g}_2 = \bar{g}_2(1:L) \quad (27)$$

where $\bar{g}_2$ is equal to the intermediate value vector sorted by element magnitude in descending order and $\check{g}_2$ is an L-element vector formed of the largest L elements of the angular domain vector $\tilde{h}_2$. In other words, the vector $\check{g}_2$ is formed of the L elements of the angular domain vector representing the L largest channel gains.

The value vector is in this example the vector $\check{g}_2$. It is noted the subscript '2' denotes that the value vector is formed for the channel vector $h_2$.

As mentioned above, the value of L can be selected depending on implementation and in some examples is equal to the number of resolvable physical paths, P. If the value of L=P there is no need to perform the activity of selecting the L largest elements of the vector $\bar{g}_2$. Thus, in some arrangements the value vector is the vector $\bar{g}_2$, or it may be the vector $\tilde{g}_2$ on the basis the vector elements do not need to be sorted if all P elements identified by the angular domain support points are retained.

At 306, the uplink device 204 feeds back an indication of the generated value vector to the downlink device 202.

The processing unit 228 may communicate an indication of the value vector to the second set of RF chains 224 which then generate analogue signals representing the indication of the value vector that are passed to antenna 1 of the antenna array 222 (this being the only antenna capable of transmitting in the uplink direction). Antenna 1 then transmits the signals representing the indication of the value vector in the uplink direction to the downlink device 202 to feed back the indication of the value vector to the downlink device 202.

The indication of the value vector may be generated using a quantization codebook, C, known to both the uplink device 204 and the downlink device 202. The quantization codebook is formed of a set of quantization vectors. The uplink device 204 can use the quantization codebook C to quantize the generated value vector. An index to the quantization codebook that indexes the quantization vector selected to quantize the value vector can then be fed back to the downlink device 202. In other words, the indication of the value vector fed back to the downlink device comprises a selected index to the quantization codebook. The quantization vectors of the codebook may be unit-norm vectors. In this case, the processing unit 228 may also calculate the magnitude of the value vector and feed this back along with the index to the quantization codebook. Thus, in implementations when the codebook contains unit-norm vectors the indication of the value vector comprises a selected index to the codebook C and the magnitude of the value vector.

The codebook C can be represented mathematically as:

$$C = \{c_1, c_2, \ldots c_{2^B}\} \quad (28)$$

where $2^B$ is the number of quantization vectors in the codebook and B is the number of bits needed to index the codebook, i.e. each codebook index is B bits.

The processing unit 228 may select the quantization vector $c_i$ from the codebook C that most closely matches the value vector $\breve{g}_2$. Specifically, the processing unit 228 might select the index $I_n$ of the codebook C to quantize the value vector according to:

$$I_n = \underset{i=1,2\ldots 2^B}{\operatorname{argmin}} \left| \frac{\breve{g}_2^H}{\|\breve{g}_2\|} c_i \right| \quad (29)$$

The index $I_n$ and the magnitude of the value vector $\|\breve{g}_2\|$ are then fed back to the downlink device 202.

The indication of the value vector $\breve{g}_2$ is received at the downlink device 202 by the antenna array 216 and RF chains 214 and passed to processing unit 218.

At 308, the downlink device 202 analyzes the channel vector $h_1$ known to the device to identify the same set of angular domain support points identified by the uplink device at 302. This may be performed by processing unit 218.

The downlink device 202 identifies the angular domain support points by analyzing the channel vector $h_1$ in the angular domain. The channel vector $h_1$ represented in the angular domain is denoted $\tilde{h}_1$, i.e. $\tilde{h}_1$ is an angular domain vector. The angular domain vector $\tilde{h}_1$ can be generated by performing a discrete Fourier transform (DFT) on the channel vector $h_1$ using the DFT matrix D. The channel vector $h_1$ can be multiplied by the DFT matrix D to generate the angular domain vector $\tilde{h}_1$. Mathematically, the device 202 generates the angular domain vector according to:

$$\tilde{h}_1 = D h_1 \quad (30)$$

The downlink device 202 analyzes the angular domain vector $\tilde{h}_1$ to generate the angular domain support points in an analogous way to how the uplink device 204 analyzed the angular domain vector $\tilde{h}_2$ described above with respect to 302. In so doing, the downlink device 202 generates the set of angular domain support points for the vector $\tilde{h}_1$, denoted $\Phi_1$ given by:

$$\Phi_1 = \{p_0^1, \ldots, p_0^P\} = \left\{ \left\lfloor \frac{d}{\lambda} N \sin \phi_1 \right\rfloor, \ldots, \left\lfloor \frac{d}{\lambda} N \sin \phi_P \right\rfloor \right\} \quad (31)$$

The angular domain support points for the vector $\tilde{h}_1$ are therefore equivalent to the angular domain support points for the vector $\tilde{h}_2$ given by equation (23). To see this, it is noted that the angular domain support points for the vector $\tilde{h}_2$ are dependent only on the angle of departures $\phi_p$ and not the angle of arrivals $\theta_p$. It has also been observed from equations (11) and (12) that $h_1 = A g_1$ and $h_2 = A g_2$ and from equation (8) that the steering matrix A is dependent on the same angle of departures as the angular domain support points. The vectors $h_1$ and $h_2$ therefore have common angular domain support, i.e. they share equivalent angular domain support points. This is consistent with the physical interpretation of the MIMO system 200: typically, the distance between adjacent antennas of the uplink device 204 is much smaller than the distance between the scattering object (e.g. 208 and 210) and the uplink device. This means that the physical propagation paths for the two antenna are via the same scattering objects and so the channel vectors for the two antenna depend on the same angle of departures.

At 310, the downlink device 202 generates the transmit steering matrix A from the calculated set of angular domain support points $\Phi_1$. As will be explained in more detail below, the downlink device 202 generates the transmit steering matrix from one or more angles of departure calculated from the angular domain support points $\Phi_1$. In general, the downlink device 202 generates the transmit steering matrix from L angles of departure calculated from the respective L elements of the angular domain vector representing the L largest channel gains. That is, the transmit steering matrix A is generated from the set of L angular domain support points representing the L largest channel gains.

To identify the set of L angular domain support points representing the largest channel chains from the angular domain support points $\Phi_1$, the downlink device 202 generates a value vector from the angular domain support points $\Phi_1$. The value vector is formed from the elements of the angular domain vector $\tilde{h}_1$ representing the largest channel gains. The value vector is generated by selecting the L largest elements of the angular domain vector $\tilde{h}_1$.

Mathematically, the value vector is calculated in an analogous way to the value vector $\breve{g}_2$ described above by first applying selected rows of the DFT matrix D to the channel vector $h_1$. The rows of the DFT matrix to be applied are determined by the angular domain control points $\Phi_1$. In particular, the rows having row numbers equal to the angular domain support points are to be applied to the channel vector. This is expressed mathematically as:

$$\tilde{g}_1 = D(\Phi_1,:) h_1 \quad (32)$$

Or, put another way:

$$[\tilde{g}_1]_i = D(p_0^i,:) h_1 \quad (33)$$

where $\tilde{g}_1$ is a vector formed of P elements of the angular domain vector $\tilde{h}_1$ identified by the P angular domain support points $\Phi_1$. The vector $\tilde{g}_1$ may be referred to as an intermediate value vector.

The vector $\tilde{g}_1$ is then sorted by its norm in descending order with the L elements representing the largest channel gains then being selected. This may be done by selecting the L largest elements of the vector $\tilde{g}_1$.

Mathematically:

$$\bar{g}_1 = \operatorname{sort}(\tilde{g}_1) \quad (34)$$

$$\breve{g}_1 = \bar{g}_1(1:L) \quad (35)$$

where $\bar{g}_1$ is equal to the intermediate value vector sorted by element magnitude in descending order and $\breve{g}_1$ is an L-element vector formed of the largest L elements of the angular domain vector $\tilde{h}_1$. In other words, the vector $\breve{g}_1$ is formed of the L elements of the angular domain vector $\tilde{h}_1$ representing the L largest channel gains. The vector $\breve{g}_1$ is the value vector calculated by the downlink device 202. The subscript '1' denotes that the value vector is formed for the channel vector $h_1$.

The downlink device further calculates an index vector $I_1$ that describes the arrangement of the elements of $\tilde{g}_1$ into $\bar{g}_1$ in the sorted dimension. The vector $I_1$ is therefore a P-element vector indicating the rearrangement of $\tilde{g}_1$. The first L elements of the vector $I_1$ therefore identify, or index, the L elements of the vector $\tilde{g}_1$ representing the largest channel gains.

The set of L angular domain support points representing the largest channel gains can therefore be identified from the set of angular domain support points $\Phi_1$ according to:

$$\tilde{\Phi}_1 = \Phi_1(I_1(i)), i=1, \ldots L \quad (36)$$

Thus, in summary, the downlink device 202 calculates the set of P angular domain support points $\Phi_1$ from the channel vector $h_1$ known to that device. Each of these angular domain support points identifies a respective element of the angular domain vector $\tilde{h}_1$. The set of L angular domain support points $\tilde{\Phi}_1$ representing the largest channel gains are then identified, where L is less than or equal to P. In the example described above, this set of points is identified by calculating an intermediate value vector $\tilde{g}_1$ formed of the P elements of the angular domain vector $\tilde{h}_1$ identified by the set of P angular domain support points $\Phi_1$. The intermediate value vector is then sorted by its norm in descending order and the L elements representing the largest channel gains identified by an index vector $I_1$. The index vector is then used to index the corresponding L angular domain support points in the set of P angular domain support points $\Phi_1$.

In line with equations (31) and (36), the angles of departure $\phi_l$ for $l=1, \ldots L$ can be calculated from the identified set of L angular domain support points as follows:

$$\phi_l = \arcsin\left(\frac{\lambda}{Nd}\tilde{\Phi}_1(l)\right) \quad (37)$$

In line with equation (8), the steering matrix A for the L identified angles of departure is calculated by the downlink device 202 as:

$$A = \left[a\left(\arcsin\left(\frac{\lambda}{Nd}\tilde{\Phi}_1(1)\right), N\right), \ldots a\left(\arcsin\left(\frac{\lambda}{Nd}\tilde{\Phi}_1(L)\right), N\right)\right] \quad (38)$$

Matrix A represents the transmit steering matrix calculated from the set of angular domain control points $\tilde{\Phi}_1$ calculated at the downlink device 202. It is an N×L matrix.

At 312 the device 202 calculates the uplink estimate of the channel vector $h_2$, denoted $\bar{h}_2$, from the indication of the value vector $\tilde{g}_2$ fed back from the device 204 and the steering matrix A calculated at the device 202.

Specifically, the downlink device 202 can calculate the channel vector estimate $\bar{h}_2$ according to:

$$\bar{h}_2 = \|\tilde{g}_2\| A c_F \quad (39)$$

where $c_F$ is the quantization vector from the codebook C selected according to the index $I_n$ fed back from the device 204, and $\|\tilde{g}_2\|$ is the magnitude of the value vector $\tilde{g}_2$ fed back from the device 204.

The vector $\bar{h}_2$ is the calculated estimate of the channel vector $h_2$ that could not be calculated through downlink estimation techniques.

The above-described approach to calculating the channel vector can provide several advantages over conventional techniques of channel estimation. The vector which is quantized and fed-back to the downlink device 202 is a reduced-dimension L dimensional vector, where L is less than or equal to P, the number of resolvable physical paths. The number of physical paths is typically much smaller than the number of antennas at the downlink device, N, and thus the approach compares favorably with conventional approaches of limited feedback where an N-dimensional vector is quantized and fed back. By reducing the size of the vector to be quantized a more accurate quantization can be performed for a codebook of a given size. Furthermore, it has been appreciated that there is a correlation between the channels in the angular domain and thus channels of different receivers of the downlink device have a common angular domain support (i.e. they share a common set of angular domain points). This enables the feedback of the angular domain support points to be omitted, reducing the channel feedback overhead.

FIG. 5 shows simulation results obtained by the inventors that demonstrate the above approach enables a high sum-rate performance to be achieved with relatively low channel feedback overhead.

In this simulation, the value vector $\tilde{g}_2$ is quantized using a 6-bit random vector quantization (RVQ) codebook. The sum-rate performance that can be achieved with ideal channel state information (CSI) is shown at 502. The sum-rate performance that can be achieved using an optimal (i.e. non-quantized) value vector $\tilde{g}_2$ is shown at 504. The sum-rate performance that can be achieved with the present feedback scheme and value vector $\tilde{g}_2$ quantized using a 6-bit RVQ codebook is shown at 506, and the conventional limited feedback using an RVQ codebook is shown at 508. It is observed that the feedback scheme described herein outperforms the conventional RVQ codebook scheme that quantizes N-dimensional vectors. Furthermore, it can be observed that the performance loss incurred by quantizing the value vector is relatively small, which means a channel feedback scheme with good performance can be achieved without increasing the channel feedback overhead compared to conventional schemes.

Having calculated an estimate of the channel vector $h_2$, the downlink device 202 can calculate an estimate of the channel matrix H using the estimated channel vector $\bar{h}_2$ and the calculated channel vector estimate $h_1$ (e.g. obtained from uplink channel estimation) to obtain full CSI. Having calculated the channel matrix H, the downlink device 202 can calculate an updated precoding matrix F. To do this, the downlink device can use singular value decomposition (SVD) to decompose the channel matrix as:

$$H = U\Sigma V^H \quad (40)$$

where U is the left singular matrix, $\Sigma$ is the diagonal matrix consisting of singular values in decreasing order and V is the right singular matrix.

The precoding matrix F can then be calculated from the first M columns of V as:

$$F = V[I_M 0]^T \quad (41)$$

where $I_M$ is an M×M identity matrix.

The downlink device can then communicate signals over the antenna array 216 using the updated, or optimized, precoding matrix F.

In the examples described herein, the uplink device 204 contained two antennas, with one of those being unable to transmit in the uplink direction. It will be appreciated that this is for the purposes of illustration only, and that the techniques described herein are applicable to a downlink device with any suitable number of antennas. In general, the techniques described herein enable an estimate for a channel vector h between the downlink device and an antenna of the uplink device to be calculated at the downlink device using other channel vectors available to the downlink device (e.g. obtained using uplink estimation techniques) and an indication of a value vector containing elements of the channel vector h in the angular domain fed back from the uplink device. In some implementations, for example, the uplink device may contain 8 antennas, with four of those being limited to receiving downlink transmissions (i.e. only four antennas being capable of transmitting in the uplink dimension).

In the examples above, a set of L angular domain support points are identified and used to calculate the channel vector estimate. In some examples, L is equal to P. In these circumstances, there may be no need to sort the vector $\tilde{g}_2$ and select L elements to generate the value vector at the uplink device: the vector $\tilde{g}_2$ may be taken as the value vector, which is then quantized and fed back to the downlink device. Furthermore, at the downlink device there may be no need to identify the set of L angular domain support points by calculating the vector $\tilde{g}_1$: instead the P angles of departure used for calculating the matrix A could be calculated directly from the set of P angular domain control points $\Phi_1$ in line with equation (37).

The applicant hereby discloses in isolation each individual feature described herein and any combination of two or more such features, to the extent that such features or combinations are capable of being carried out based on the present specification as a whole in the light of the common general knowledge of a person of ordinary skill in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person of ordinary skill in the art that various modifications may be made within the scope of the present disclosure.

The invention claimed is:

1. A method of performing channel estimation in a multiple-input-multiple-output (MIMO) communication system comprising a downlink device and an uplink device arranged to communicate over a communication channel, the method comprising:
   at the uplink device:
      analyzing a first channel vector representing channel gains between the downlink device and a first antenna of the uplink device in an angular domain to identify a set of angular domain support points each indicating a respective element of the first channel vector in the angular domain;
      generating from the set of angular domain support points a value vector containing elements of the first channel vector in the angular domain representing the largest channel gains;
      feeding back from the uplink device to the downlink device an indication of the value vector;
   at the downlink device:
      analyzing a second channel vector representing channel gains between the downlink device and a second antenna of the uplink device in the angular domain to identify the set of angular domain support points;
      generating from the set of angular domain support points a transmit steering matrix; and
      generating an estimate of the first channel vector from the indication of the value vector fed back from the uplink device and the generated transmit steering matrix.

2. The method of claim 1, wherein the method further comprises using the estimate of the first channel vector to generate an estimate of a channel matrix modeling the channel between the downlink device and uplink device.

3. The method of claim 2, wherein the method further comprises deriving a digital precoding matrix using the estimated channel matrix for use in precoding data to be transmitted from the downlink device.

4. The method of claim 2, wherein the set of angular domain support points are identified from the non-zero elements of the channel matrix in the angular domain.

5. The method of claim 1, wherein the uplink device is arranged to use the first antenna only for receiving communications from the downlink device and to use the second antenna for receiving communications from the downlink device and transmitting communications to the downlink device.

6. The method of claim 1, wherein analyzing the first channel vector in the angular domain comprises transforming the first channel vector to the angular domain using a discrete Fourier transform (DFT) matrix.

7. The method of claim 6, wherein analyzing the second channel vector in the angular domain comprises transforming the second channel vector to the angular domain using the discrete Fourier transform (DFT) matrix.

8. The method of claim 1, wherein the value vector is generated by selecting the P largest elements of the first channel vector in the angular domain, where P is the number of resolvable paths between the downlink device and the uplink device.

9. The method of claim 1, wherein the method comprises quantizing the value vector at the uplink device using a codebook, the indication of the value vector comprising a selected index to the codebook.

10. The method of claim 9, wherein the indication of the value vector further comprises a magnitude of the value vector.

11. The method of claim 10, wherein only the selected index and the magnitude of the value vector are fed back from the uplink device to the downlink device.

12. The method of claim 9, wherein the selected index, $I_n$, is selected according to $$I_n = \operatorname*{argmin}_{i=1,2\ldots 2^B} \left| \frac{\tilde{g}_2^H}{\|\tilde{g}_2\|} c_i \right|,$$

where $\tilde{g}_2^H$ is the Hermitian conjugate of the value vector $\tilde{g}_2$, $C = \{c_1, c_2, \ldots c_{2^B}\}$ is the codebook, $c_1$ is a quantized vector of the codebook C and B is the number of bits to access the codebook.

13. The method of claim 1, wherein each angular domain support point of the identified set of angular domain support points is dependent on a beam angle of departure for a respective path between the downlink device and uplink device.

14. The method of claim 13, wherein the transmit steering matrix is generated using the one or more beam angles of departure calculated from the set of angular domain support points.

15. The method of claim 1, wherein the set of angular domain support points $\phi$ may be given by:

$$\phi = \left\{ \frac{d}{\lambda} N \sin\phi_1, \ldots \frac{d}{\lambda} N \sin\phi_P \right\}$$

where d is the spacing between adjacent antenna elements of the downlink device; $\lambda$ is the wavelength of the signal emitted from the downlink device; N is the number of antenna elements at the downlink device and $\phi_p$ is angle of departure of a beam of signals emitted by the downlink device along the p'th path between the downlink device and the uplink device.

16. The method of claim 1, wherein the MIMO communication system is a time-division-duplex (TDD) MIMO communication system.

17. A multiple-input multiple-output (MIMO) communication system comprising a downlink device and an uplink device configured to communicate over a communication channel;
the uplink device comprising:
a plurality of antennas; and
a processing unit configured to:
analyze a first channel vector representing channel gains between the downlink device and a first antenna of the uplink device in an angular domain to identify a set of angular domain support points each indicating a respective element of the first channel vector in the angular domain;
generate from the set of angular domain support points a value vector containing the elements of the first channel vector in the angular domain representing the largest channel gains; and
feed back to the downlink device an indication of the value vector;
the downlink device comprising:
a plurality of antennas; and
a processing unit configured to:
analyze a second channel vector representing channel gains between the downlink device and a second antenna of the uplink device in the angular domain to identify the set of angular domain support points;
generate from the set of angular domain support points a transmit steering matrix; and
generate an estimate of the first channel vector from the indication of the value vector fed back from the uplink device and the generated transmit steering matrix.

* * * * *